May 29, 1945.  W. F. HEROLD  2,377,232
WHEEL MOUNTING
Filed Dec. 3, 1942  9 Sheets-Sheet 1

Inventor
Walter F. Herold,
By Rockwell & Bartholow
Attorneys

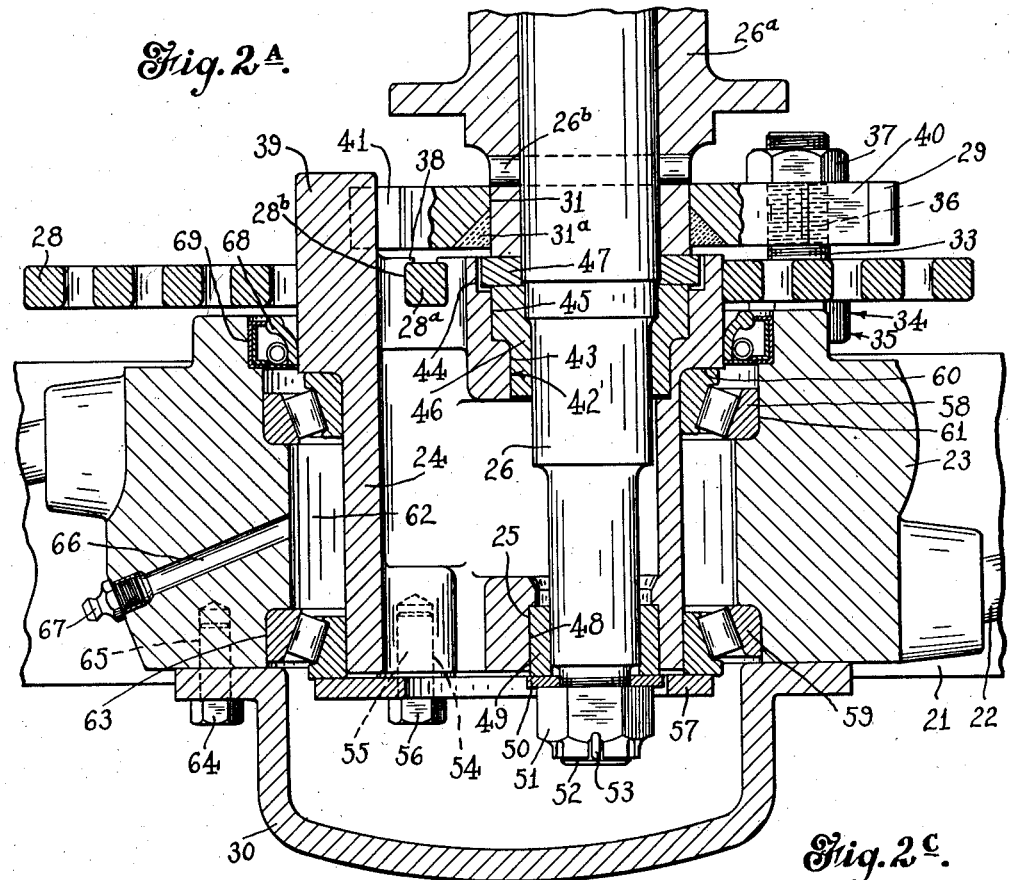
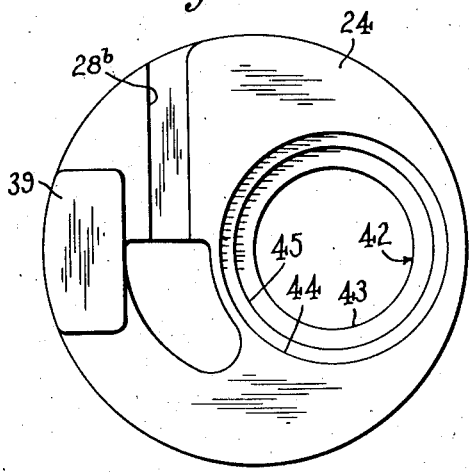
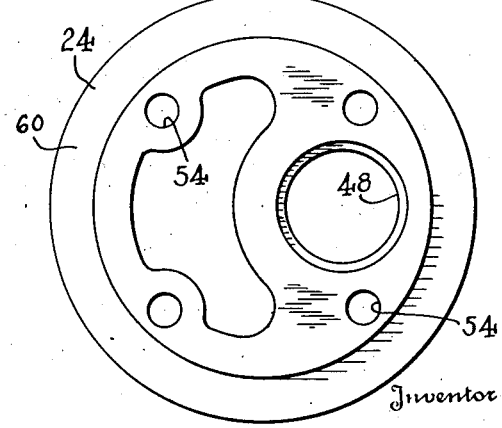

Inventor
Walter F. Herold
By Rockwell Bartholow
Attorneys

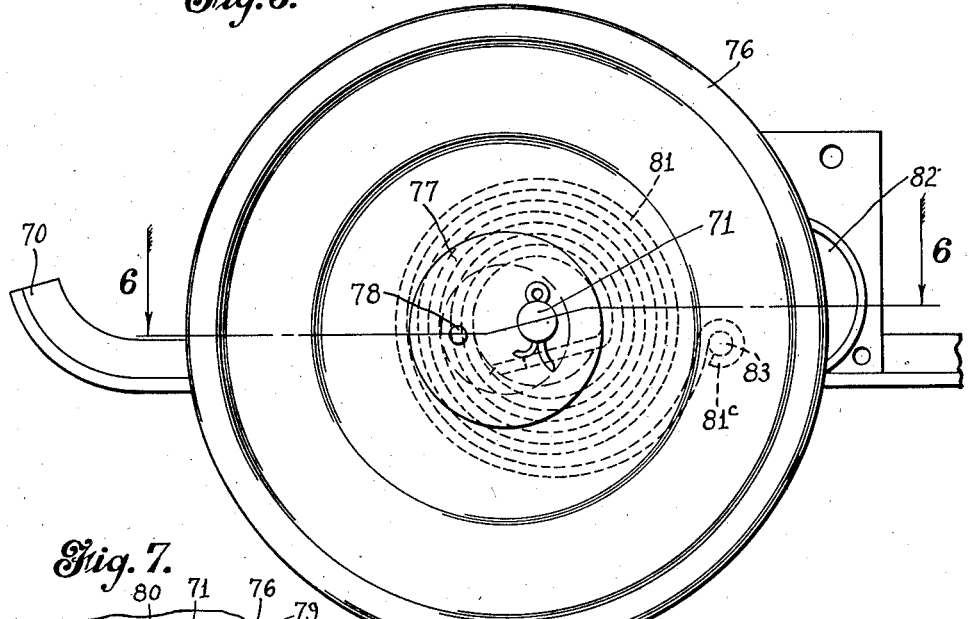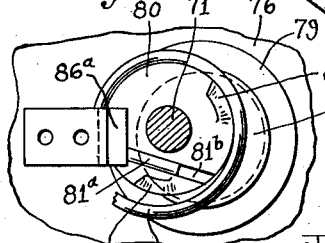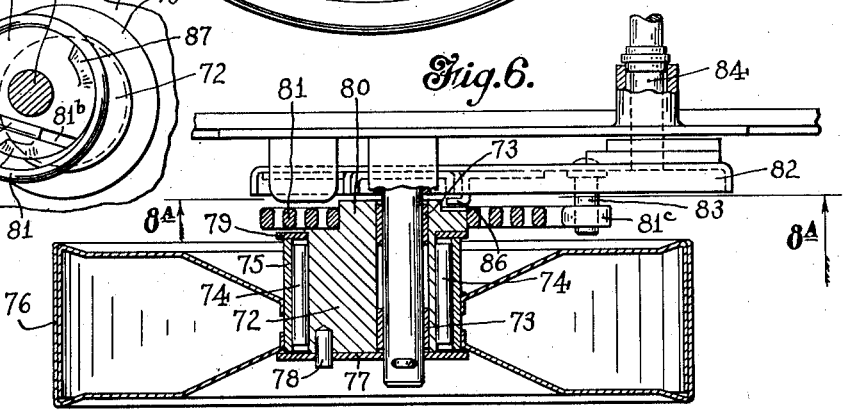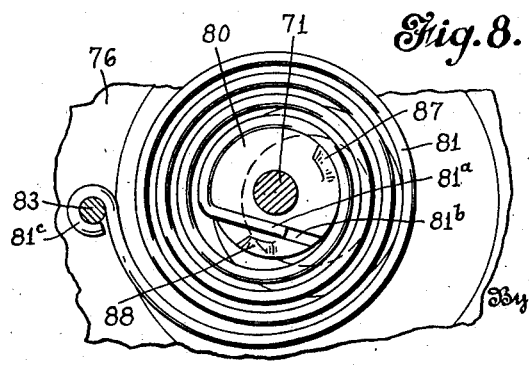

May 29, 1945. W. F. HEROLD 2,377,232
WHEEL MOUNTING
Filed Dec. 3, 1942 9 Sheets-Sheet 5

Inventor
Walter F. Herold
By Rockwell & Bartholow
Attorneys

May 29, 1945.  W. F. HEROLD  2,377,232
WHEEL MOUNTING
Filed Dec. 3, 1942  9 Sheets-Sheet 6

Inventor
Walter F. Herold
By [signature]
Attorneys

May 29, 1945. W. F. HEROLD 2,377,232
WHEEL MOUNTING
Filed Dec. 3, 1942 9 Sheets-Sheet 7
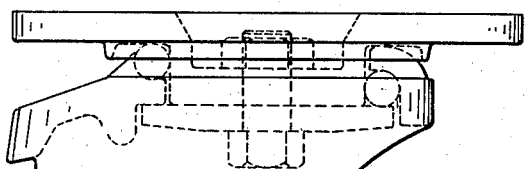
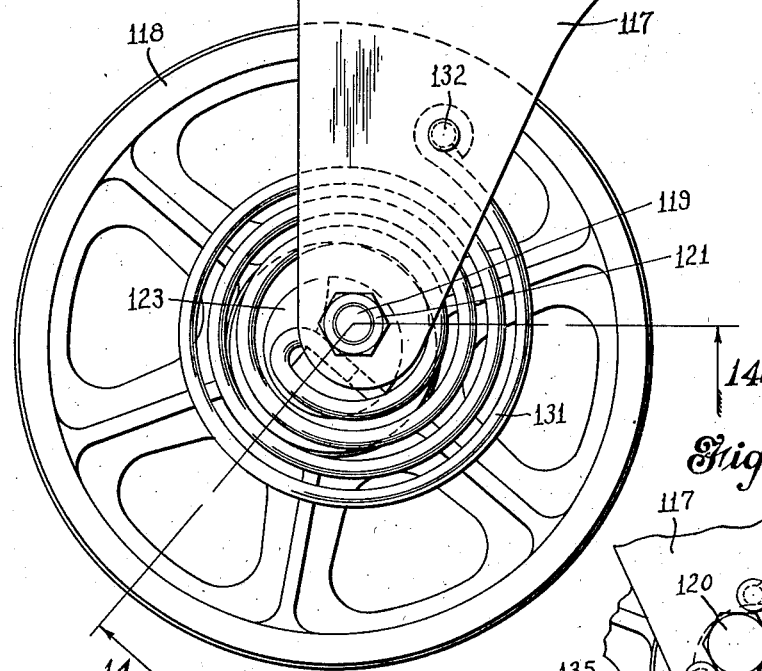
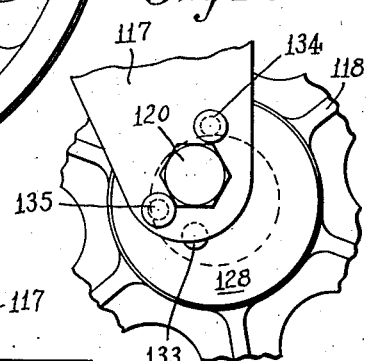
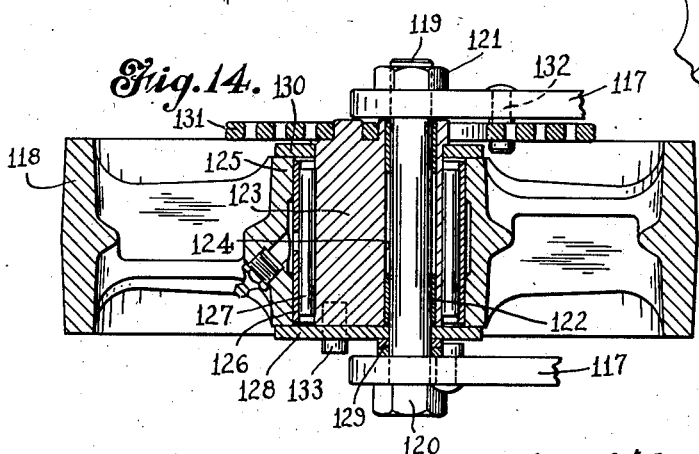
Inventor
Walter F. Herold May 29, 1945. W. F. HEROLD 2,377,232
WHEEL MOUNTING
Filed Dec. 3, 1942 9 Sheets-Sheet 8

Inventor
Walter F. Herold
By Bauer & Bartholow
Attorneys

Patented May 29, 1945

2,377,232

UNITED STATES PATENT OFFICE 2,377,232

WHEEL MOUNTING

Walter F. Herold, Easton, Conn., assignor to The Bassick Company, Bridgeport, Conn., a corporation of Connecticut Application December 3, 1942, Serial No. 467,708

18 Claims. (Cl. 301—133)

This invention relates to wheel mountings, and while not limited thereto, it has special reference to resilient mountings for wheels of industrial trucks, trailers and vehicles of a like nature, where the wheel has a rigid tread portion or is of that class where a rigid tread portion is commonly employed. In wheels commonly used on industrial trucks, for example, the wheel has little, if any, resiliency, and in wheels such as used on small trailers, for example, there may be some "give" owing to the use of spokes imparting some resiliency, but even in that case the resilience is slight in the absence of a resilient tire. Pneumatic tires are expensive and hard to secure, and the resilience of solid tires of elastic material is insufficient for the intended purposes.

One of the objects of my invention is to provide a wheel mounting of an improved kind, whereby the wheel, as a result of its mounting, can ride or float over bumps and road roughness, so that the progress of the truck or other vehicle lacking pneumatic tire equipment is much more even, steadier and easier to control.

Another object is to provide a very simple, rugged and durable wheel mounting achieving what may be termed a knee-action effect, and particularly well suited to industrial trucks and like vehicles.

Another purpose which I have in view is to furnish a satisfactory wheel mounting of the character indicated in which it is unnecessary to employ rubber as the cushioning material, a sufficiently yielding mounting being provided by the employment of one or more metal springs, and the spring being of such form and character as to reduce to a minimum the need for repairs and replacements.

A further purpose of the invention is to furnish a wheel mounting applicable to various uses where the wheel is subject to shock, in which an improved snubbing effect is produced.

To these and other ends the invention consists in the novel features and combinations of parts to be hereinafter described and finally pointed out in the claims.

In the accompanying drawings:

Fig. 1 is a side elevation showing a spoked trailer wheel equipped with a mounting embodying my invention, the hub cap being removed;

Fig. 2 is a section on line 2—2 of Fig. 1, with the hub cap in place;

Fig. 2A is a view on a larger scale, in section, illustrating some of the parts shown in Fig. 2;

Figs. 2B and 2C are detail views, looking from opposite ends, of the cam or skein member on which the hub portion of the wheel is rotatably supported;

Fig. 5 is a side elevation of a wheel and a portion of a vehicle, illustrating a modified form of wheel mounting;

Fig. 6 is a section on line 6—6 of Fig. 5;

Fig. 7 is a detail, partly in section through the axle, showing the arrangement of the stops which limit the cushioned movement of the wheel;

Fig. 8 is a detail, partly in section through the axle, looking from the side of the wheel opposite to that shown in Fig. 5 and showing the arrangement of the spring;

Fig. 9 shows a further modification of the wheel mounting, the wheel in this case being an idler supporting an endless belt or track in a tractor or the like;

Figure 10:
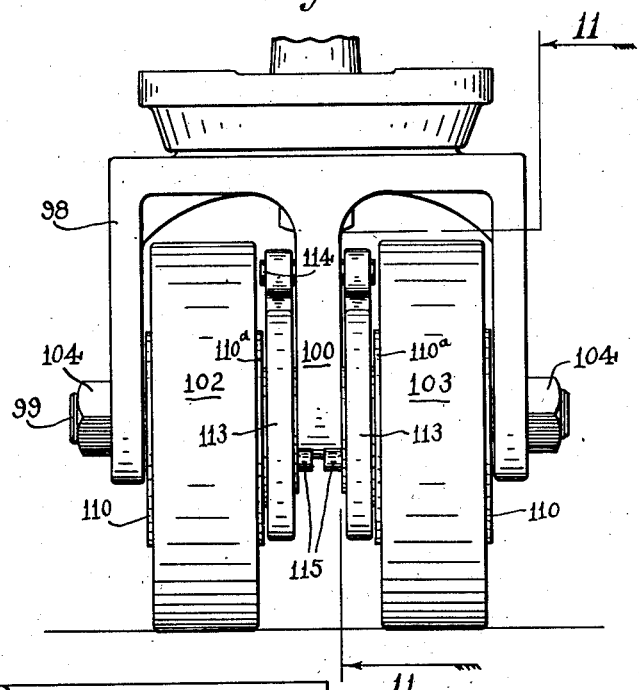
Figure 8A:
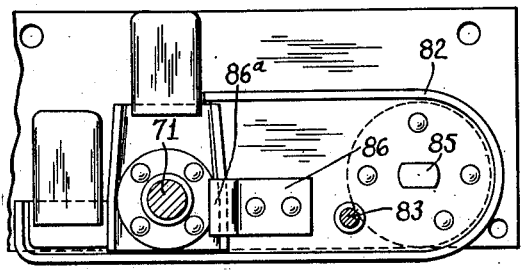
Fig. 8A is a section on line 8A—8A of Fig. 6, showing the manner of mounting the axle on the vehicle.
Figure 11:
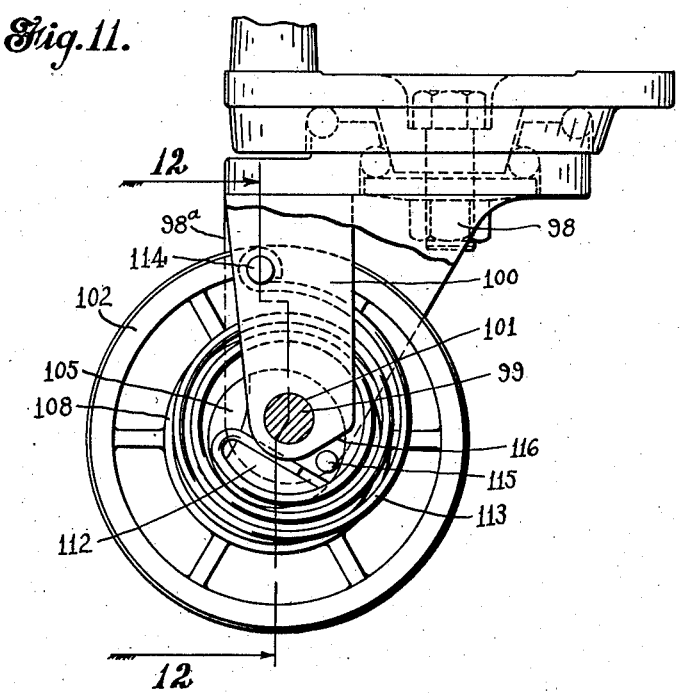
Figure 12:
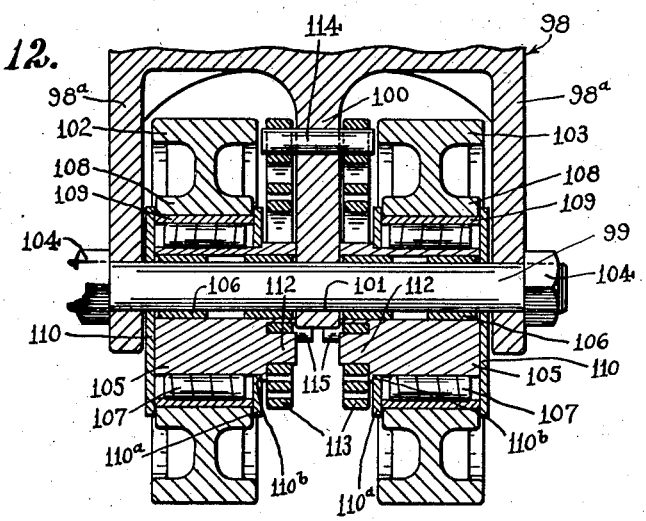
Figure 16:
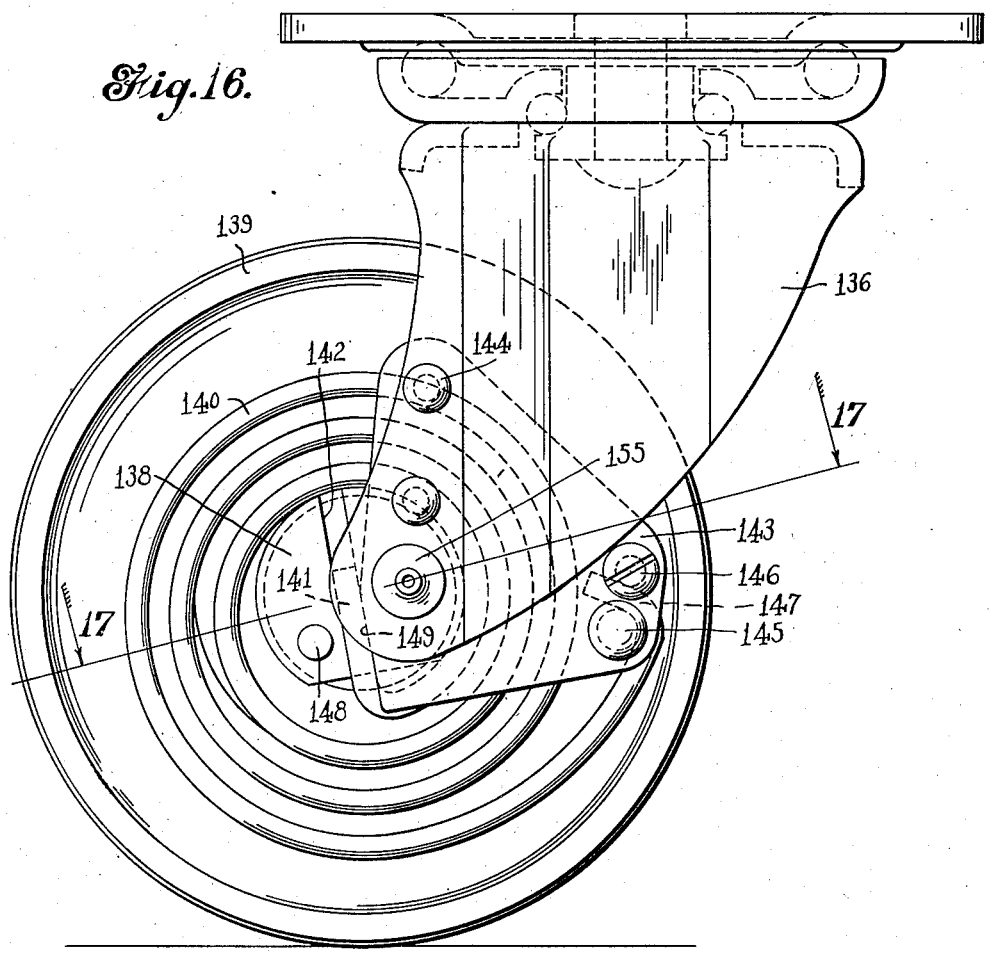
Figure 17:
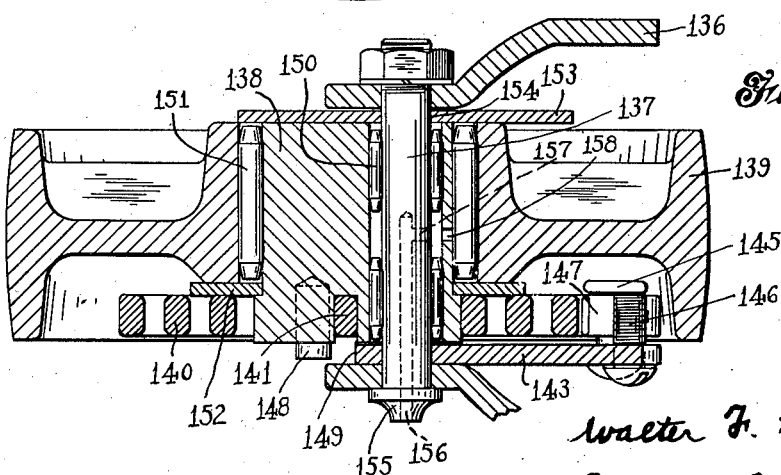
Figure 18:
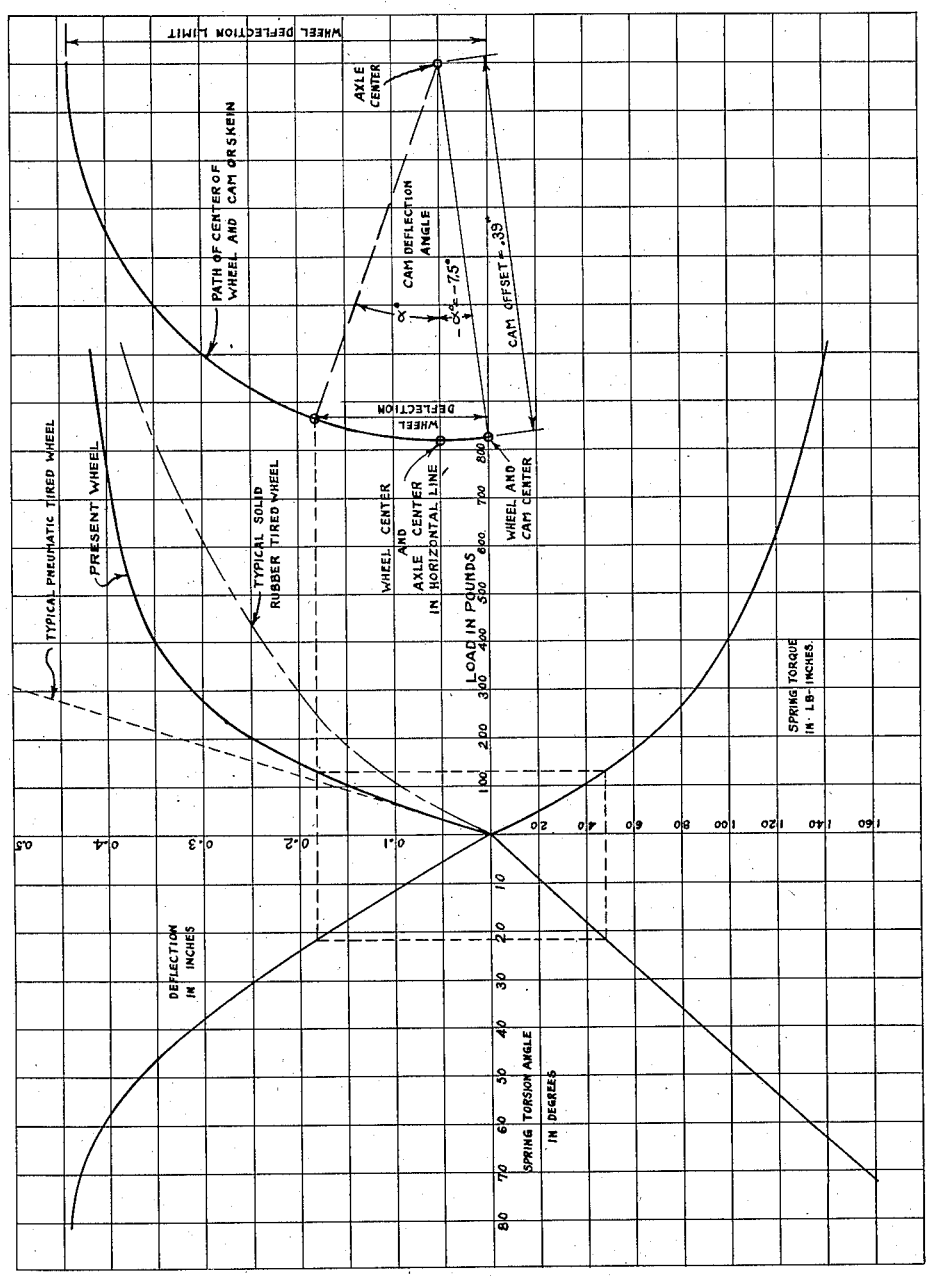

Figs. 10, 11 and 12 show a further modification in which the wheel mounting is applied to a duplex caster for industrial trucks and the like, the caster having wheels arranged side by side in a supporting horn, Fig. 10 being an end view, Fig. 11 a side view partly in section on line 11—11 of Fig. 10, and Fig. 12 a section on line 12—12 of Fig. 11;

Figs. 13, 14 and 15 show a further modification illustrating the mounting applied to a caster having a single wheel, Fig. 13 being a side elevation, Fig. 14 a section on line 14—14 of Fig. 13, and Fig. 15 a detail showing the arrangement of the stops;

Figs. 16 and 17 show a still further modification, the mounting in this case being used in a single wheel caster, Fig. 16 being a side elevation, and Fig. 17 a section on line 17—17 of Fig. 16; and Fig. 18 is a chart illustrating the action of the wheel mounting.

In the form shown in Figs. 1 to 4, inclusive, the invention is illustrated as applied to a wheel for a small trailer or like vehicle, where the wheel has a rigid rim and spokes of rod material supporting the rim from the hub. In this case, as in other cases illustrated herein, the structure includes an axle member with means for supporting it more or less rigidly from a suitable support (in this case the vehicle frame), a rotary supporting member or skein, eccentrically disposed with reference to the axle and in embracing relation thereto and having an eccentrically located bearing cooperating with an external bearing portion on the axle such that the skein and axle can have relative turning or angular movement, the wheel being mounted for free rotation on the peripheral portion of the skein. Also there is provided adjacent at least one end of the axle a yielding external connection between the skein or wheel support and the supporting structure of the axle, this yielding connection comprising a coiled spring, the action of which is to resist in a yielding manner the relative rotation of the axle and skein, the arrangement being such that when a bump is encountered the wheel moves upwardly independently of the axle, building up resistance in the spring as the wheel rises, the spring acting to maintain the wheel yieldingly in contact with the surface over which it travels. Also, suitable stops are provided to limit the up-and-down travel of the wheel with respect to its supporting axle.

In the form of Figs. 1 to 4, inclusive, the wheel is indicated generally at 20, and is of the type having a rigid metal rim 21 connected by rod-like spokes 22 to a hub 23. The hub 23 is rotatably mounted by means of suitable antifriction bearings on the periphery of a rotary supporting member or skein 24, having in an eccentric location relatively to the skein, interior bearing means generally indicated at 25 providing a socket or bearing for an axle stud 26 rigidly supported from a vehicle frame or body 27. Adjacent the inner end of the skein 24 a spiral spring 28 is provided connected at one end to the skein and at the other end to a part of the supporting structure of the axle stud 26. In this particular case the outer end of the spiral spring 28 is connected to an arm 29 adjacent the outer end of said arm, the inner end of the arm being rigidly connected to the axle stud. In this particular case the spiral spring 28 is located adjacent the wheel at the inner side of the wheel, and the arm 29 is at the inner side of the spring. A hub cap 30 at the outer side of the wheel is attached to the hub in a suitable manner as by bolts, and encloses the wheel bearing. In Fig. 1 the hub cap is omitted.

Referring now to the details, it will be noted from Fig. 2$^A$ that the axle stud 26 includes as a part of its structure an enlarged portion 26$^a$ attached in any suitable manner to the frame or body 27. In this particular case, the enlargement is provided by placing a separate sleeve member over the larger proximal end of the axle stud proper, as indicated in Fig. 2$^A$, and attaching it fixedly to the stud proper as by means of a pin 26$^b$, but many variations can obviously be made in this respect. In this particular case the arm 29 has adjacent its inner end an aperture 31 by which it embraces the enlarged portion of the axle stud structure, and it may be fastened to this structure in a suitable manner as by a weld 31$^a$. The spring 28 is a spiral spring of the "pancake" type, lying in a single plane, that plane being perpendicular to the axle and the spring material preferably being steel. The spring is made by coiling up in spiral form a length of material which is of considerable thickness, and preferably has a rectangular cross section as shown. The turns of the coil are spaced apart, but the space between the turns is, for the most part, at least, relatively small, so that under certain conditions certain turns may make contact with each other, as hereinafter pointed out. The outer end of the spring is secured to the outer end portion of the arm 29 in a suitable manner, for example, by having the end of the spring bent to form an eye 32 engaged by the shank 33 of a bolt 34 secured to and projecting laterally from the arm 29. Preferably this bolt has a head 35 at the outer side of the spring relatively to the vehicle, the head 35 being of somewhat larger diameter than the opening in eye 32, and the shank of the bolt is provided with screw threads 36 engaging corresponding threads in a hole through arm 29. After the bolt has been adjusted in place in the arm, it is locked in position by means of a lock nut 37. The inner end portion of the spring is fastened to the skein 24, preferably by being interlocked therewith, for which purpose a portion 28$^a$ at the inner end of the spring is bent at an angle, and engaged and locked in a groove 28$^b$ in the end face of the skein.

The skein 24 is shown in Figs. 2$^B$ and 2$^C$ as it appears before assembly, and in Fig. 2$^B$ is shown the groove 28$^b$, which in this particular case has chordal relation to the round end face of the skein. After the end portion of the spring has been engaged in the groove, the metal adjacent the groove is distorted so as to overlie the spring portion slightly, as shown in Fig. 2$^A$ at 38, whereby the spring extremity is tightly locked in place. Fig. 2$^B$ also shows a stop member 39 projecting from the end face of the skein adjacent the periphery thereof, so as to cooperate with stop shoulders 40 and 41 on the arm 29 in order to limit the up-and-down movement of the wheel. Fig. 2$^B$ also shows a socketed portion 42 provided in the skein adjacent the inner end, located eccentrically of the skein and adapted to support a portion of the stud axle 26. The socket portion 42 has a portion 43 of minimum diameter, a portion 44 of maximum diameter, and a portion 45 of intermediate diameter. The portions 43 and 45, as shown in Fig. 2$^A$, receive a shouldered sleeve bearing member 46 for a portion of the stud axle, and the portion 44 receives a washer 47 embracing the axle. The outer end face of the skein is shown in Fig. 2$^C$, and it will be noted that at the outer end of the skein the same is provided with a shouldered socket 48 in line with socket 42 and somewhat smaller, which receives and holds a bearing sleeve 49 for the outer end portion of the axle stud. The sleeve 49 is held in the socket 48 by a washer 50, which in turn is held in place by a nut 51 engaging threads on the reduced extremity 52 of the stud, the nut 51 being locked in place by suitable means such as a cotter pin 53. Fig. 2$^C$ also shows the outer end face of the skein as provided with a number of tapped holes 54 which receive the shanks 55 of headed screws 56, which hold in place a retaining ring 57, which is instrumental in holding the wheel hub in place on the skein.

The wheel hub 23 is rotatably supported from the skein through the use of anti-friction bearings, and in this particular form of the mounting there is an inner roller bearing 58 and an outer roller bearing 59. It will be noted that the periphery of the skein is shouldered so as to provide adjacent the inner end of the skein a shoulder 60, and the roller bearing 58 has its inner race set against this shoulder, whereas the outer race of this bearing is received in an annular recess 61 in the wheel hub bore 62. The outer race of roller bearing 59 is received in an annular recess 63 in the wheel hub, and the inner race of the bearing 59 is held by the ring or retainer 57 above mentioned.

The hub cap 30 is held in place by a number of screws 64 engaging tapped holes 65 in the adjacent end face of the wheel hub.

The roller bearings are supplied with oil by an oil duct 66 leading inwardly through the wheel hub from a nipple 67. Escape of oil at the inner side of the wheel between the hub and the adjacent portion of the skein is prevented in a suitable manner as by the use of a packing ring 68 providing an oil seal. The packing material bears against that portion of the skein which is of larger diameter, and the oil seal ring can be received in an annular recess 69 adjacent the mouth of the wheel hub bore, as shown in Fig. 2ᴬ.

It will be understood that with the construction described the spiral spring, secured at the outer end to a fixed part and secured at the inner end to the axle skein 24, tends to hold the skein in a predetermined angular position when the wheel is free of the ground. This position in the particular case shown is disclosed in Fig. 3, and it will be noted that in this position the stop member 39 on the skein, while close to the fixed stop 41, is free of engagement therewith. Now supposing that the vehicle wheel were lowered to engage the ground or other supporting surface so that the wheel would take its share of the load of the vehicle when the latter is empty, the spring would be lightly tensioned or wound and the stop 39 would have a small counter-clockwise movement from the position shown in Fig. 3. The turns of the spring would be closer together than in the condition of Fig. 3, but there would still be substantial spacing between them. In this condition the wheel is supported in a yielding manner so that the vehicle floats over any roughness of the ground or other underlying surface without the transference of vibration or shocks to the vehicle, and of course this makes steering and other control of the vehicle much easier than it would be otherwise. Supposing that the wheel encounters a small bump or upward projection, the wheel will be enabled to lift vertically while under spring control as a result of the eccentric mounting or cam-like arrangement of the skein relatively to the axle.

Figure 4:
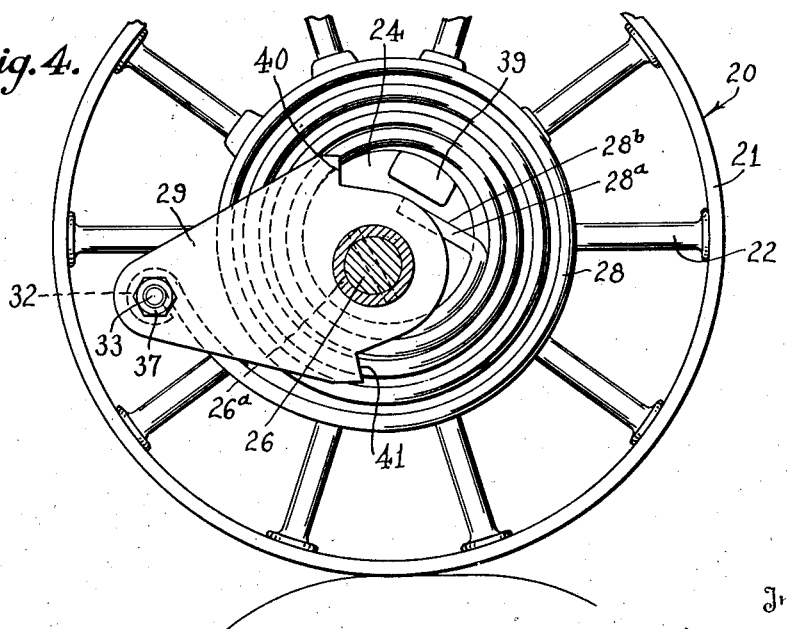

Fig. 4 shows how the wheel takes a large bump, and in this case there is a greater upward movement of the wheel under the control of the spring, but even with such a large bump as represented in Fig. 4, the stop member 39 does not reach upper stop 40 so as to make contact therewith. It will be observed that when the wheel reaches an elevated position such as shown in Fig. 4, the inner turns of the spring at one side (the right-hand side) begin to engage each other, and this is a feature of decided advantage, as it provides a sort of snubbing action which supplies additional resistance to the rise of the wheel, and makes the spring action slower and more satisfactory than it would be otherwise.

Figure 3:
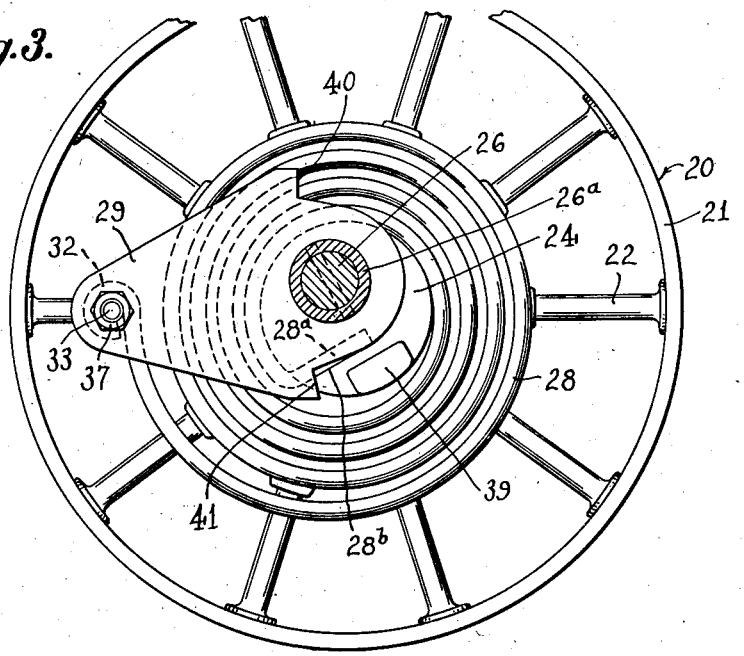
Figs. 3 and 4 are views of the wheel from the side opposite to that shown in Fig. 1, partly in section, Fig. 4 showing a position of the parts as the wheel goes over a bump.

It will be understood that, as the wheel moves downward along the far side of the bump represented in Fig. 4, those turns of the spring which are engaged with each other will disengage, and the parts will move back toward, but not to, a position such as indicated in Fig. 3.

In this particular form the spiral spring has its generating point or axis coincident or approximately coincident with the center of the skein, the innermost turn of the spring conforming to the cylindrical periphery of the skein over a substantial length, as indicated in Figs. 2 and 3. In this form the spring is located closely adjacent the wheel hub end and a portion of the spring is engaged with the end of the skein so as to lie approximately flush with the end face, as above explained. The supporting member from which the outer end of the spring is supported lies in this case transversely to the axle and parallel to the plane of the spring at the side opposite the wheel hub. It will be understood that there is a journaling of the axle in the skein provided by the bearings spaced along the axle, these bearings enabling the skein and axle to turn readily relatively to each other. An effective rigid bearing of the skein on the axle is provided so that there is no tendency to twist or bind, notwithstanding the fact that the spring support is provided at one end only of the skein and in a zone where the skein projects beyond the wheel hub. It will be understood, of course, that the stops which are adapted to limit the angular movement of the skein under certain circumstances also act against a portion thereof which is extended inwardly beyond the wheel hub. These stops do not operate in the usual operation of the wheel, but it will be understood that they act to prevent excessive vertical movement of the wheel in either direction, being somewhat of the nature of safety devices.

In the form of the invention shown in Figs. 5 to 8ᴬ there are minor differences of structure. Here a vehicle frame 70 carries an axle stud 71 about which a wheel-supporting member or skein 72 is rotatably mounted, there being bearing sleeves 73 interposed between the skein and the axle. Rotatably supported on the periphery of the skein by rollers 74 is the relatively thin metal hub 75 of a sheet metal wheel body 76. The wheel body 76 is made up from sheet metal pieces which are attached to the member 75 in a suitable manner. At the outer end of the skein a metal finishing plate 77 is secured by means such as the pin 78. Adjacent the inner end of the skein a similar finishing plate 79 is employed.

At the inner end of the skein the latter is continued integrally to provide a spring-supporting portion 80 against the periphery of which is placed the innermost turn of a spiral spring 81. In this particular case the spring-seating portion 80 is concentric with the axle rather than with the skein, as in the case of the first form described. The spring 81 is generally similar to the spring first described, and, as in the case of the spring 28, has an inner extremity (81ᵃ) held in place in a groove (81ᵇ) in the end face of the skein, although in this instance the groove is relatively longer than in the first form. As in the case first described, the outer extremity of the spring is attached to a fixed supporting member, and in this instance the supporting member is an arm 82 having a pin 83 projecting therefrom into an eye 81ᶜ on the end of the spring. The arm 82 is supported from the vehicle frame by means of a rod 84 supported on the frame and rigidly fastened to the arm 82 at 85. Fastened to the arm 82 is a stop plate 86 with which cooperate integral projecting stop members 87 and 88 formed integrally with the skein at the end face and corresponding in general to the stop-provisions in the form first described.

It will be obvious that the operation of this form of wheel mounting will be substantially the same as that of the first form.

The stop member 86 is constituted by a plate fastened to the arm 82 and having a portion projecting toward the opposing end of the skein and provided with a terminal portion 86ᵃ which lies between the stop shoulders 87 and 88, as indicated in Fig. 7.

Figure 9:
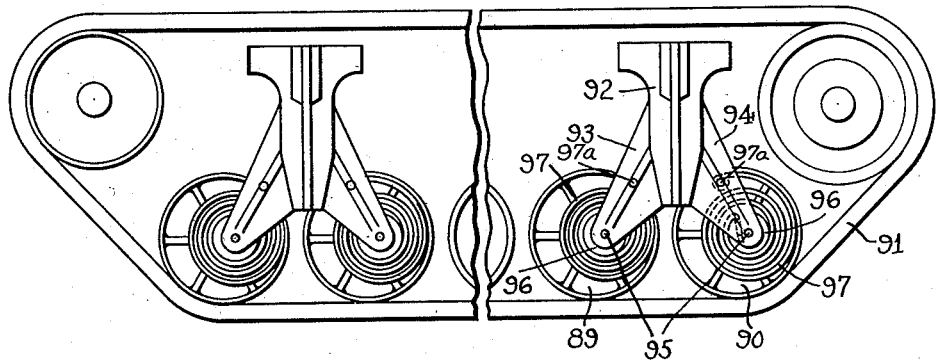

In the form shown in Fig. 9, the invention is applied to idler wheels used for supporting a traveling belt or track 91 in a tractor or like machine. In this case two of the wheels (89 and 90) are arranged in tandem formation and supported from a single stationary bracket 92 mounted on the frame and having forks 93 and 94, respectively, for the wheels. The wheels are supported in the forks by fixed axles 95 and have eccentrically mounted skeins 96 and spiral springs 97, operating in the manner previously described, or in a manner described hereinafter. The spring in each case has an outer end attached to the fork 93 or 94, as the case may be, by a pin 97ª. Such a structure provides very effective means for pressing the idler wheel strongly against the belt or track, and with a spring in the form of a pancake spiral applied to each wheel individually, and operating as described, there is better control and less spring breakage than in the case of previous spring-mounted idler rollers.

In the form shown in Figs. 10, 11 and 12, the wheels, instead of being mounted in tandem in a bracket, as in the form just described, are mounted alongside of each other on a common axle, and in this case what is termed a double axle for industrial trucks is shown. This particular caster is of the swiveling type, but in using the term "caster" herein it is employed in a broad sense so as to apply also to a wheel which is held against movement about an upright axis.

In the form of Figs. 10 to 12, inclusive, the caster has a bracket or horn 98 with relatively wide side legs 98ª in the lower ends of which are supported an axle 99. Above the horn is means for attaching the same to a vehicle body. Between the side legs 98ª an intermediate leg 100, somewhat narrower and shorter than the others, is provided, and the leg 100 has a lower perforation 101 by which it embraces the axle so as to provide an intermediate axle support. At the respective sides of the intermediate leg are caster wheels 102 and 103 which in this case are rigid metal wheels. The axle 99 is held in place in the horn by end nuts 104. Each of the wheels 102, 103 is provided with a skein 105 eccentrically mounted by means of bearing sleeves 106 on a portion of the axle, and mounted about the skein and spaced therefrom by rollers 107 is a wheel hub 108 supported from the rollers by a lining member or sleeve 109. A finishing plate 110 is used at the outer end of each wheel so as to enclose and cover the wheel bearing, and the finishing plate is held in place by the adjacent leg of the horn, there being only a slight amount of play. At the opposite end of the skein a spring-supporting projection or extension 112 eccentric to the axle extends toward the intermediate leg 100 to such a degree that a portion of the projection is in substantial contact with said leg. A spring 113, attached to the projection 112 substantially in the manner hereinbefore described, and lying alongside the wheel at the inner side of the wheel, is attached to the leg 100 in a location above the axle, and by preference the springs of the two wheels are fastened to said leg by the same fastening member, which in this case is constituted by a pin 114 extending through and fastened in the leg and having projecting ends engaging eyes formed on the ends of the springs. A finishing plate 110ª covers the roller bearing of each wheel at the end opposite the finishing plate 110, and this plate 110ª embraces the skein loosely, and is held against a shoulder 110ᵇ located at the junction between the body portion of the skein and the skein extension which supports the spring.

By this construction, a very effective double caster is provided in which the wheels, while supported from the same axle, are capable of independent cushioned movement in a vertical direction relative to the axle. Thus one wheel may have a higher position than the other in order to provide effective support for the vehicle or other structure on an uneven supporting surface.

In this case, as in the previous cases, suitable stops are provided for limiting the upward and downward movement of the wheel, and in this instance the stop means for each wheel includes a stop pin or projection 115 on the inner end face of the skein adapted to act in conjunction with portions of the intermediate leg 100. At its lower part the leg 100 has an inclined edge portion 116 adapted, when the wheel is moved to a predetermined extent in a spring-unwinding direction, to be engaged by the stop 115. On the other hand, on movement of the wheel in an upward direction to a predetermined extent relatively to the axle, the pin 115 will engage a portion of the front edge of leg 100.

In the form illustrated in Figs. 13 to 15, inclusive, the invention is shown applied to a single-wheel caster, which in this particular instance is of the swiveling type. Here the supporting horn is shown at 117 and the wheel at 118, the wheel being supported from an axle 119 held in place in the horn by a bolt head 120 at one end and a nut 121 at the other end. Bearing sleeves 122 are arranged between the axle and the skein 123, as in the form last described, these sleeves being in an eccentric bore 124 of the skein. The wheel hub 125 is mounted on the skein by means of an internal sleeve 126 bearing against rollers 127. A finishing plate 128 having a perforation by which it is set over the axle encloses the roller bearing at one end, washers 129 being interposed between this plate and the adjacent horn leg. At the other end of the bearing a finishing plate 130 is used, this plate being in the form of a ring which embraces the skein and is supported against a shoulder thereon, as in the case last described. The arrangement of the spring 131 is similar to that last described, the spring being mounted on the skein in the same manner as before. However, it is to be noted that in this particular embodiment the spring is secured at its outer end to one of the legs of the horn by means such as a pin 132 secured in the leg and having an inwardly projecting portion engaging the eye at the end of the spring. As in the form illustrated in Fig. 11, and also the form of Figs. 5 and 6, the spring is arranged so as to be approximately concentric to the axle rather than to the skein, and by this arrangement I am enabled to locate the free end of the spring so that it can be conveniently attached directly to a horn leg such as customarily used in casters, a simple fastening arrangement such as shown in Fig. 13, or an equivalent arrangement, being all that is necessary for anchoring the spring, and the wheel mounting being of such a type that it can be readily incorporated in a caster having the usual horn and the usual axle.

In this particular case the stops for limiting the up-and-down movement of the wheel are provided by equipping the skein at one end with a stop pin 133 which projects outwardly beyond the finishing plate 128, and has a path of movement between stop members 134 and 135 in the nature of inwardly projecting rivets carried by the lower portion of the adjacent horn leg.

The caster illustrated in Figs. 16 and 17 is quite similar to that just described, but in this last-mentioned case the spring is arranged approximately centrally with respect to the skein rather than the axle, and under these circumstances I employ a special attaching member to which the outer end of the spring is connected. In this form the horn legs are shown at 136, the axle at 137, the skein at 138, and the wheel at 139. The spring is shown at 140, and it will be seen that at its inner end it has a straight portion 141 fastened in a face groove 142 of the skein. The outer end of the spring is secured to an attaching plate or bracket 143, which is in turn fastened to one of the legs 136. The point of attachment of the outer end of the spring is in this case laterally of the skein rather than above it. The plate 143 may be fastened to the adjacent horn leg by means such as rivets 144; the plate 143 being at the inner side of the horn leg, and a portion of plate 143 extending downwardly beyond the horn leg. The end of the spring is secured by being inserted between two projecting members carried by plate 143, one of these being a pin 145 and the other being a screw 146. The spring has an integral short turned-in portion 147 positioned between and held by these projecting members.

For limiting the vertical travel of the wheel, a stop pin 148 is carried by one end face of the skein. This stop pin cooperates with the adjacent edge portion of the plate 143, which has an edge portion 149 adapted to be abutted at different points by the stop pin. When the wheel rises to a predetermined extent the pin 148 will engage the edge portion 149 at a point above the axle, and upon lowering the wheel to a predetermined extent the stop pin will engage the edge portion 149 at a point below the axle.

By reference to Fig. 17 it will be seen that small rollers 150 are interposed between the skein and the axle, and that rollers 151 are arranged between the skein and the wheel hub. A finishing ring or cover plate 152 corresponds to member 130, previously described, and at the opposite side of the wheel a metal disk 153 has a perforation 154 by means of which it can be slipped over the axle so that, without fastening it in place, it can act as a satisfactory cover for the wheel bearing.

In this particular form the axle 137 is provided at one end with a fixed head 155 through which extends an oil duct 156 that leads to the middle portion of the axle, where it communicates with a lateral port 157, enabling oil to be supplied to the small rollers 150. The oil can also pass by way of a port or ports 158 in the skein to the rollers 151.

In forms previously described herein, as for example that of Fig. 13, the wheel mounting is shown in a position in which the wheel carries no load, that is to say, a position assumed by the wheel if lifted off of the ground or floor. It is to be noted, however, that in Fig. 16 the mounting is shown with the wheel supported by the ground or floor, so that the wheel bears its portion of the load of the vehicle, which in the condition shown here is assumed to be empty.

It will be noted from Fig. 16 that in this particular form the spring has somewhat more than three turns, but less than four. In the form shown in Fig. 3 there are slightly more than four turns. I do not limit myself to any particular number of turns, and these are examples only, but it will be understood that relatively few turns are required. In all of the cases shown the arrangement is such as to produce the contact of certain turns with each other in order to produce the snubbing effect referred to above.

It will be apparent that when the wheel is rolling over the supporting surface the axle will have a relatively fixed position by virtue of the relatively rigid support provided therefor, and that as the wheel goes over a bump the skein is allowed to move eccentrically with respect to the axle against the resistance of the spring, the skein mounted inwardly of the spring and connected to its inner end acting in the nature of a cam, which, on the upward movement of the wheel, has the effect of winding the spring, which builds up resistance to the upward travel of the wheel.

In Fig. 18 I have shown a chart illustrating as an example the action of a particular wheel having my improved mounting, that wheel in this particular instance being the caster shown in Fig. 16, which is supposed to be a six-inch caster. In such a caster the total possible deflection of the wheel in a vertical direction may be, say, somewhat less than .45 inch, and this is represented by a vertical line at the upper right-hand side of the chart, which also illustrates by an arcuate line the path of travel of the center of the wheel, which is also in this case the center of the cam or skein 138. As indicated at the right-hand side of the chart, the wheel center, when the wheel is engaged with the floor and without load, is somewhat below the axle center, the downward deflection angle of the wheel center being of the order of 7.5 degrees, as indicated. Upon loading of the vehicle, this angle is eliminated and the wheel center comes up to the horizontal line, or somewhat above it. The wheel then has a substantial or large portion of the arcuate line (above mentioned) available for compensation as the wheel travels over bumps or encounters other obstructions.

As the chart is laid out, it will illustrate graphically the result of deflecting the wheel center upwardly through any given angle. In the case illustrated in the chart, it is assumed that the upward angle of deflection from the horizontal is twenty degrees, as indicated by the upwardly inclined dotted line drawn from the axle center at the right of the chart. By following the horizontal dotted line drawn from the intersection of this first dotted line with the arcuate line showing the path of the wheel center, it will be seen what results are obtained as regards wheel deflection in inches, spring torsion angle in degrees, spring torque in pound-inches, and wheel load in pounds. In the particular case illustrated it will be noted that with a skein or cam deflection angle of twenty degrees, the wheel will be deflected slightly less than .2 inch. The spring torsion angle will be somewhat in excess of 20 degrees, the spring torque will be slightly less than 50 pound-inches, and the wheel load will be about 125 pounds.

The chart also offers a graphic comparison to an extent between the wheel mounting of the present invention, the typical solid rubber-tired wheel of equivalent size, and the typical pneumatic-tired wheel of equivalent size. It is shown how, on the initial upward movement of the wheel, the deflection of the wheel of the present invention closely follows that of the corresponding pneumatic-tired wheel, but the present wheel is limited in its deflection, as above stated, and in the region near the upper limit of its travel the graph line turns off rather sharply, this being due to a degree to the snubbing action produced by the interengagement of the spring turns. The chart also shows that, in comparison to an equivalent wheel equipped with a solid tire, the present wheel has noticeably greater resiliency and smoothness of action.

It will be seen from the foregoing description that the invention provides a simple, relatively inexpensive, rugged wheel mounting of the cushioned or knee-action type having many advantages over the ordinary types of mountings. A vehicle equipped with such mountings has many attributes of one equipped with pneumatic rubber tires of relatively large cross section, and yet the cost is less and the durability greater. The working parts are subjected to very little wear and the wheel will serve for a relatively long period without repairs being necessary. Springs such as herein described are very strong, and even under severe conditions of use such springs operate through long periods without breakage. A spring such as herein described forms a very satisfactory external connection between the skein and the wheel support, and with a spring employed at one side only of the wheel there is a very satisfactory control of the rising and falling movement of the wheel relatively to the axle. The improved result is, moreover, obtained without the need of using rubber as a cushioning means.

While in certain aspects of the invention the use of a spiral spring is important, the invention in all of its aspects is not limited to the employment of a metal spring. As regards the feature of providing a resilient external support for the skein or wheel-supporting member, which also has the function of a snubber, broad novelty is believed to be present, warranting a broad construction of the claims in this regard. Obviously the invention is not restricted to the employment of a wheel having a rigid rim or tread and, in some cases, it may be expedient to provide the wheel with a resilient tire of appropriate character.

While I have described several different embodiments of the invention, numerous other embodiments are within the principles of the invention, and various modifications in the organization of parts and in the details can be made within the scope of the claims.

What I claim is:

1. In a duplex wheel structure, the combination of a forked support and wheels mounted in said support for cushioned up-and-down movement independently of each other, each wheel having a supporting axle portion, a skein mounted to turn thereon about an axis eccentric to the skein and supporting the corresponding wheel for rotation, and a spring of spiral form adjacent one end of the skein and connected at its inner end to the skein and at its outer end to the support.

2. In a duplex wheel structure, the combination of a forked support and wheels mounted in said support for cushioned up-and-down movement independently of each other, each wheel having a supporting axle portion, a skein mounted to turn thereon about an axis eccentric to the skein and supporting the corresponding wheel for rotation, and a spring of spiral form adjacent one end of the skein and connected at its inner end to the skein and at its outer end to the support, said wheels being arranged side by side, and the axle portions referred to being parts of the same axle.

3. Means for supporting a vehicle or other structure movable on and over an uneven supporting surface, comprising a wheel to support the structure on the uneven surface, an axle, an axle support, means for connecting the axle support to said structure, a skein mounted on the axle for turning on an axis eccentric to the skein and about which said wheel is revoluble, and resilient means normally holding the skein in a predetermined angular relation to the axle including a spiral spring connected at its inner end to the skein and at its outer end to a point which is fixed in relation to the axle support.

4. Means for supporting a vehicle or other structure movable on and over an uneven supporting surface, comprising a wheel to support the structure on the uneven surface, an axle, an axle support, means for connecting the axle support to said structure, a skein mounted on the axle for turning on an axis eccentric to the skein and about which said wheel is revoluble, and resilient means normally holding the skein in a predetermined angular relation to the axle including a spiral spring connected at its inner end to the skein and at its outer end to the axle support.

5. Means for supporting a vehicle or other structure movable on and over an uneven supporting surface, comprising a wheel to support the structure on the uneven surface, an axle, an axle support, means for connecting the axle support to said structure, a skein mounted on the axle for turning on an axis eccentric to the skein and about which said wheel is revoluble, and resilient means normally holding the skein in a predetermined angular relation to the axle including a spiral spring having a small-diametered portion embracing and fastened to the skein and a large-diametered portion connected to the axle support.

6. Means for supporting a vehicle or other structure movable on and over an uneven supporting surface, comprising a wheel to support the vehicle from beneath on the uneven surface, an axle, an axle support, means for connecting said axle support to said structure, said axle projecting laterally from said structure, a skein mounted on the axle for turning on an axis eccentric to the skein and about which the wheel is revoluble, and resilient means normally holding the skein in a predetermined angular relation to the axle including a spiral spring of a diameter greater than that of the skein connected at the inner end to the skein and at the outer end to a point which is fixed in relation to the axle support, said spring resisting upward movement of the wheel center when the wheel encounters an obstacle.

7. Means for supporting a vehicle or other structure movable on and over an uneven supporting surface, comprising a wheel to support the structure on the uneven surface, an axle, an axle support, means for connecting the axle support to said structure, a skein mounted on the axle for turning on an axis eccentric to the skein and about which said wheel is revoluble, and resilient means normally holding the skein in a predetermined angular relation to the axle including a spiral spring of a diameter substantially larger than that of the skein connected at the inner end to the skein and at the outer end to the axle support.

8. Means for supporting a vehicle or other structure movable on and over an uneven supporting surface, comprising a wheel to support the structure from beneath on the uneven surface, an axle, an axle support, means for connecting the axle support to said structure, a skein mounted on the axle for turning on an axis eccentric to the skein and about which said wheel is revoluble, and a spiral spring of substantially larger diameter than the skein connected at its inner end to the skein and at its outer end to the axle support, said spring winding up from its inner end under road shock.

9. Means for supporting a vehicle or other structure movable on and over an uneven supporting surface, comprising a wheel to support the vehicle from beneath on the uneven surface, an axle, an axle support including legs connected to the respective ends of the axle, means for connecting said axle support to said structure, a skein mounted on the axle for turning on an axis eccentric to the skein and about which the wheel is revoluble, the skein being extended at one end substantially beyond the wheel face, and a spiral spring connected at its outer end to the axle support and connected at its inner end to the extended portion of the skein so that when the wheel encounters an obstacle the spring is wound from the inner end.

10. Means for supporting a vehicle or other structure, comprising a wheel to support the structure from beneath, an axle, an axle support, means for connecting the axle support to said structure, a skein mounted on the axle for turning on an axis eccentric to the skein and about which said wheel is revoluble, a spiral spring anchored at the outer end to the axle support and connected at the inner end to the skein so that when the wheel encounters an obstacle the spring is wound from the inner end, and means for preventing more than a predetermined unwinding movement of the spring.

11. Means for supporting a vehicle or other structure movable on and over an uneven supporting surface, comprising a wheel to support the structure on the uneven surface, an axle, an axle support, means for connecting the axle support to said structure, a wheel support mounted on the axle for turning movement thereon about which the wheel is revoluble and which when turned on the axle shifts the wheel center, and a spiral spring externally disposed adjacent one side of the wheel having its outer end in fixed relation to the vehicle structure and its inner end connected to said wheel support for winding thereby.

12. Means for supporting a vehicle or other structure movable on and over an uneven supporting surface, comprising a wheel to support the structure from beneath on the uneven surface, an axle, an axle support, means for connecting the axle support to said structure, a wheel support mounted on the axle for turning movement thereon about which the wheel is revoluble and which when turned on the axle raises and lowers the wheel center, a spiral spring externally disposed adjacent one side of the wheel having its outer end in fixed relation to the vehicle structure and its inner end connected to said wheel support for winding thereby, and means for preventing more than a predetermined unwinding of said spring.

13. Means for supporting a vehicle or other structure movable on and over an uneven supporting surface, comprising a wheel to support the structure from beneath, an axle, an axle support, means for connecting the axle support to said structure, a skein mounted on the axle for turing on an axis eccentric to the skein and about which said wheel is revoluble, a spiral spring having an inner end portion embracing and connected to the skein and an outer end connected to a part which is fixed in relation to the axle support, and means including a part projecting outwardly from said skein which limits the unwinding movement of said spring.

14. Means for supporting a vehicle or other structure movable on and over an uneven supporting surface, comprising a wheel to support the structure from beneath, an axle, an axle support, means for connecting the axle support to said structure, a skein mounted on the axle eccentrically and about which said wheel is revoluble, and a spiral spring disposed at one side of the wheel and having an outer end in fixed relation to the axle support and an inner end portion embracing the skein and locked in a groove in an end face of the skein.

15. In a vehicle, in combination, a vehicle body, an axle, an axle support, means to connect the axle support to the vehicle body, a skein eccentrically mounted on the axle, a wheel revoluble about the skein and adapted to support the vehicle body from beneath, a spiral spring having its outer end in fixed relation to the vehicle body and adapted to be wound from its inner end by and from said skein, and means for limiting the unwinding movement of the spring.

16. In a vehicle, in combination, a vehicle body, a stud axle having a proximal end connected to the vehicle body, a skein eccentrically mounted on the stud axle, a wheel revoluble about the skein supporting the body from beneath, and a spiral spring located at the bodyward side of the wheel having its larger end in fixed relation to the axle and its smaller end connected to the skein so that the spring is wound from its inner end by the skein.

17. Means for supporting a vehicle or other structure movable on and over an uneven supporting surface, comprising a wheel to support the structure from beneath, an axle, an axle support comprising a duplex member having legs supporting the axle from the respective ends, means for connecting the axle support to the vehicle or other structure, a skein mounted on the axle for turning on an axis eccentric to the skein and about which the wheel is revoluble, and a spiral spring at one side of the wheel having its inner end fastened to the skein and its outer end connected to one of the legs of said axle support.

18. Means for supporting a vehicle or other structure movable on and over an uneven supporting surface, comprising a wheel to support the structure from such surface, an axle, an axle support comprising a duplex member having legs supporting the axle from the respective ends, means for connecting the axle support to the vehicle or other structure, a skein mounted on the axle for turning on an axis eccentric to the skein and about which the wheel is revoluble, and a spiral spring at one side of the wheel having its inner end fastened to the skein and its outer end connected to one of the legs of said axle support at a point above the axle.

WALTER F. HEROLD.